United States Patent
Yilmaz et al.

(10) Patent No.: US 11,166,204 B2
(45) Date of Patent: *Nov. 2, 2021

(54) LIGHT-WEIGHT RRC CONNECTION SETUP IN MULTI-RAT NETWORK

(71) Applicant: Telefonaktiebolaget LM Ericsson (publ), Stockholm (SE)

(72) Inventors: Osman Nuri Can Yilmaz, Espoo (FI); Elena Myhre, Järfälla (SE); Jose Luis Pradas, Stockholm (SE); Paul Schliwa-Bertling, Ljungsbro (SE); Stefan Wager, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/889,867

(22) Filed: Jun. 2, 2020

(65) Prior Publication Data

US 2020/0305036 A1    Sep. 24, 2020

Related U.S. Application Data

(63) Continuation of application No. 16/144,764, filed on Sep. 27, 2018, now Pat. No. 10,687,256, which is a
(Continued)

(51) Int. Cl.
*H04W 36/00* (2009.01)
*H04W 76/16* (2018.01)
(Continued)

(52) U.S. Cl.
CPC ... *H04W 36/0033* (2013.01); *H04W 36/0022* (2013.01); *H04W 36/0066* (2013.01);
(Continued)

(58) Field of Classification Search
CPC ......... H04L 47/70; H04L 47/72; H04L 47/74; H04L 47/78; H04L 47/80; H04L 47/10;
(Continued)

(56) References Cited

U.S. PATENT DOCUMENTS

| 8,041,335 | B2 | 10/2011 | Khetawat et al. |
| 8,391,239 | B2 | 3/2013 | Tenny et al. |

(Continued)

FOREIGN PATENT DOCUMENTS

| CN | 102160419 A1 | 8/2011 |
| CN | 102474718 A | 5/2012 |

(Continued)

OTHER PUBLICATIONS

3rd Generation Partnership Project, "3rd Generation Partnership Project; Technical Specification Group Radio Access Network; Evolved Universal Terrestrial Radio Access Network (E-UTRAN); Architecture description (Release 12)", Technical Specification, 3GPP TS 36.401 V12.2.0, Mar. 1, 2015, pp. 1-21, 3GPP, France.
(Continued)

*Primary Examiner* — Dady Chery
(74) *Attorney, Agent, or Firm* — Coats + Bennett, PLLC

(57) ABSTRACT

The present disclosure generally relates to the field of Radio Resource Control (RRC). More specifically, the present disclosure relates to techniques of supporting and initiating RRC connection establishment in a wireless communication network. A method embodiment relates to supporting RRC connection establishment in a wireless communication network and comprises setting up context information during a first RRC connection establishment procedure to establish a first RRC connection towards a radio access network element (200) of the wireless communication network implementing a first Radio Access Technology (RAT). The context information is associated with a wireless
(Continued)

communication device (100) of the wireless communication network and is usable for a second RRC connection establishment procedure to establish a second RRC connection towards a radio access network element of the wireless communication network implementing a second RAT.

18 Claims, 9 Drawing Sheets

Related U.S. Application Data continuation of application No. 15/108,848, filed as application No. PCT/EP2015/078521 on Dec. 3, 2015, now Pat. No. 10,123,239.

(51) Int. Cl.
H04W 76/27 (2018.01)
H04W 88/06 (2009.01)
H04W 76/19 (2018.01)
H04W 36/14 (2009.01)

(52) U.S. Cl.
CPC ........... H04W 76/16 (2018.02); H04W 76/27 (2018.02); H04W 36/0038 (2013.01); H04W 36/14 (2013.01); H04W 76/19 (2018.02); H04W 88/06 (2013.01)

(58) Field of Classification Search
CPC ....... H04L 43/00; H04L 43/50; H04L 47/767; H04L 49/30; H04L 49/351; H04L 12/66; H04L 29/08108; H04W 28/02; H04W 28/0205; H04W 28/021; H04W 28/0247; H04W 28/0252; H04W 28/0257; H04W 28/0263; H04W 28/0268; H04W 28/0273; H04W 24/00; H04W 72/04; H04W 72/12; H04W 76/00; H04W 36/00; H04W 36/0005; H04W 36/0016; H04W 92/00; H04W 92/02; H04W 92/04; H04W 92/045; H04W 92/06; H04W 92/08; H04W 92/10; H04W 92/12; H04W 92/14; H04W 92/16; H04W 92/18; H04W 92/20; H04W 92/22; H04W 92/24; H04B 17/00; H04B 3/46; H04B 7/2121; H04B 7/2123; H04B 7/18541; H04J 2203/0069; H04Q 2213/394; H04Q 1/028; H04N 21/436; H04N 21/43615; H04T 2001/105
See application file for complete search history.

(56) References Cited

U.S. PATENT DOCUMENTS

| | | | |
|---|---|---|---|
| 8,483,174 | B2 | 7/2013 | Ahmavaara et al. |
| 8,798,623 | B2 | 8/2014 | Forsberg et al. |
| 9,131,412 | B2 | 9/2015 | Geary et al. |
| 9,172,723 | B2 | 10/2015 | Prasad et al. |
| 9,699,823 | B2 | 7/2017 | Park et al. |
| 9,817,720 | B2 | 11/2017 | Horn et al. |
| 10,560,944 | B2 | 2/2020 | Marinier et al. |
| 2009/0042576 | A1 | 2/2009 | Mukherjee et al. |
| 2010/0120420 | A1 | 5/2010 | Agashe et al. |
| 2010/0020261 | A1 | 8/2010 | Yang et al. |
| 2010/0246533 | A1 | 9/2010 | Lundin et al. |
| 2010/0272263 | A1 | 10/2010 | Yao et al. |
| 2011/0159841 | A1 | 6/2011 | Escott et al. |
| 2012/0140743 | A1 | 6/2012 | Pelletier et al. |
| 2012/0163336 | A1 | 6/2012 | Adjakple et al. |
| 2012/0238208 | A1 | 9/2012 | Bienas et al. |
| 2012/0311335 | A1 | 12/2012 | Fransen |
| 2013/0010701 | A1 | 1/2013 | Uchiyama et al. |
| 2013/0044709 | A1 | 2/2013 | Adjakple et al. |
| 2013/0295939 | A1 | 11/2013 | Wegmann et al. |
| 2014/0086163 | A1 | 3/2014 | Yang |
| 2014/0086177 | A1 | 3/2014 | Adjakple et al. |
| 2014/0254528 | A1 | 9/2014 | Quan et al. |
| 2014/0269613 | A1 | 9/2014 | Tiwari et al. |
| 2014/0303285 | A1 | 10/2014 | Young et al. |
| 2014/0239633 | A1 | 11/2014 | Sajadieh et al. |
| 2015/0043537 | A1 | 2/2015 | Chen et al. |
| 2015/0049707 | A1 | 2/2015 | Vajapeyam et al. |
| 2015/0065144 | A1 | 3/2015 | Shen |
| 2015/0215836 | A1 | 7/2015 | Srivastava et al. |
| 2015/0334766 | A1 | 11/2015 | Lee et al. |

FOREIGN PATENT DOCUMENTS

| | | |
|---|---|---|
| CN | 102572819 A | 7/2012 |
| CN | 103238368 A1 | 8/2013 |
| CN | 103765974 A | 4/2014 |
| CN | 103929740 A | 7/2014 |
| EP | 1734782 A1 | 12/2006 |
| EP | 2249608 A1 | 11/2010 |
| EP | 2291048 A1 | 3/2011 |
| EP | 2579648 A1 | 4/2013 |
| EP | 2648437 A1 | 10/2013 |
| GB | 2492799 A | 1/2013 |
| JP | 2006517774 A | 7/2006 |
| TW | 200908759 A | 2/2009 |
| WO | 2004072383 | 8/2004 |
| WO | 2008020788 A1 | 2/2008 |
| WO | 2010054340 A1 | 5/2010 |
| WO | 2011125675 A1 | 10/2011 |
| WO | 2011159215 A1 | 12/2011 |
| WO | 2014136434 A1 | 9/2014 |
| WO | 2016130061 A1 | 8/2016 |
| WO | 2017092813 A1 | 6/2017 |

OTHER PUBLICATIONS

3rd Generation Partnership Project, "3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.7.0, Sep. 1, 2015, pp. 1-77, 3GPP, France.
Forsberg; "LTE Security"; GSM Security; Jan. 1, 2012; pp. 33 and 124; XP002755836; Somerset, Great Britain.
Claes Tidestav; "Massive Beamforming in 5G Radio Access"; Ericsson Research Blog; Retrieved from the Internet: URL:https://www.ericsson.com/research-blog/5g/massive-beamforming-in-5g-radio-access/ [retrieved on Nov. 15, 2016; Mar. 19, 2015, pp. 1-9.
Da Silva et al; "Tight intergration of new 5G air interface and LTE to fulfill 5G requirements"; Retrieved from the Internet: URL:http://ieeexplore.ieee.org/search/searchresult.jsp?newsearch=true&queryText=Tight%20integration%20of%20new%205G%20air%20interface%20and%20LTE%20to%20fulfill%205G%20requirements [retrieved on Oct. 2, 2015]; 81st Vehicular Technology Conference (VTC Spring); IEEE Conference Publications; 2015, pp. 1-5.
3rd Generation Partnership Project; "Technical Specification Group Radio Access Network; Evolved Universal Terrestrial Radio Access (E-UTRA); Radio Resource Control (RRC); Protocol specification (Release 12)"; Technical Specification; 3GPP TS 36.331 V12.7.0; Sep. 2015; pp. 1-453; Sophia Antipolis, Valbonne, France.
3rd Generation Partnership Project; "Technical Specification Group Services and System Aspects; 3GPP System Architecture Evolution (SAE); Security architecture (Release 13)"; Technical Specification; 3GPP TS 33.401 V13.0.0; Sep. 2015; pp. 1-131; Sophia Antipolis, Valbonne, France.
3rd Generation Partnership Project; "Technical Specification Group Services and System Aspects; 3GPP System Architecture Evolution (SAE); Security aspects of non-3GPP accesses (Release 13)"; Technical Specification; 3GPP TS 33.402 V13.0.0; Sep. 2015; pp. 1-56; Sophia Antipolis, Valbonne, France.
3rd Generation Partnership Project; "Technical Specification Group Radio Access Network; Evolved Universal Terrestrial Radio Access (E-UTRA) and Evolved Universal Terrestrial Radio Access Net-

(56) References Cited

OTHER PUBLICATIONS work (E-UTRAN); Overall description; Stage 2 (Release 13)"; Technical Specification; 3GPP TS 36.300 V13.1.0; Sep. 2015; pp. 1-254; Sophia Antipolis, Valbonne, France.

Annoni, M. et al., "Radio Access Networks Beyond 3G: A First Comparison of Architectures", 12th IEEE International Symposium on Personal, Indoor and Mobile Radio Communications, Sep. 30, 2001, pp. 133-140, IEEE.

Lei, H. et al., "Analysis and Simulation for Radio Access Network Architecture of 3GPP Long Term Evolution", 2007 IEEE 18th International Symposium on Personal, Indoor and Mobile Radio Communications, Sep. 3, 2007, pp. 1-5, IEEE.

Xu, F. et al., "Architecture for Next-Generation Reconfigurable Wireless Networks Using Cognitive Radio", 2008 3rd International Conference on Cognitive Radio Oriented Wireless Networks and Communications, May 15, 2008, pp. 1-5, IEEE.

3rd Generation Partnership Project, "3rd Generation Partnership Project; Technical Specification Group Radio Access Network Working Group 3 Meeting #89; Initial considerations on LTE-WLAN Aggregation", ZTE Corporation, Agenda item 15.1, R3-151523, CPEL1851806P, Aug. 24, 2015-Aug. 28, 2015, 9 pages, Beijing, P.R. China.

Said, S. et al. "Towards Adaptive Security Mechanisms in 3GPP EPS/LTE Networks", 2013 IEEE Wireless Communications and Networking Conference (WCNC): Networks, Jan. 1, 2013, pp. 1876-1881, IEEE.

Han, C. et al., "Security Analysis of Handover Key Management in 4G LTE/SAE Networks", IEEE Transactions on Mobile Computing, vol. 13 No. 2, Feb. 1, 2014, pp. 457-468, IEEE.

LIGHT-WEIGHT RRC CONNECTION SETUP IN MULTI-RAT NETWORK

RELATED APPLICATIONS

This application is a continuation of U.S. application Ser. No. 16/144,764, filed 27 Sep. 2018, which is a continuation of U.S. application Ser. No. 15/108,848 (now U.S. Pat. No. 10,123,239), filed 29 Jun. 2016, which was the National Stage of International Application No. PCT/EP2015/078521, filed 3 Dec. 2015, the disclosures of each of which are incorporated herein by reference in their entirety.

TECHNICAL FIELD

The present disclosure generally relates to the field of Radio Resource Control (RRC). More specifically, the present disclosure relates to techniques of supporting and initiating RRC connection establishment in a wireless communication network.

BACKGROUND

Radio Resource Control (RRC) is a signaling protocol which uses lower layers for segmentation and reliable in-order delivery of signaling messages. RRC is suitable for messages of any size requiring reliable delivery such as user equipment (UE) configuration. In Long Term Evolution (LTE) and LTE-advanced (LTE-a), RRC is involved in the Non-Access Stratum (NAS) message exchange between a UE and a Mobility Management Entity (MME) as well as provide various control-plane functions both on the UE and the evolved NodeB (eNodeB or, in short, eNB).

These control-plane functions include, on the eNB side, connection management, radio resource management, measurement configuration and mobility control, service management and security, system information broadcast and idle mode mobility. On the UE side, these control-plane functions include idle mode mobility, for example. To be more specific, in connection management RRC may play a role in RRC connection establishment, maintenance and release, radio bearer connection establishment, maintenance and release, and multi-cell and multi-node configurations. In radio resource management, RRC may be involved in configuration of radio resources for RRC connection and configuration of lower layers and in radio configuration control including e.g., assignment and/or modification of Automatic Repeat Request (ARQ) configuration, Hybrid Automatic Repeat Request (HARQ) configuration, and Discontinuous Reception (DRX) configuration. Still further, in measurement configuration and mobility control, RRC may be used in UE measurement reporting and control of the reporting and mobility functions (intra- and/or inter-frequency handover, and inter-Radio Access Technology (inter-RAT) handover). In service management and security, RRC may be involved in Multimedia Broadcast Multicast Service (MBMS), Quality of Service (QoS) management functions and Access Stratum (AS) security, and, in system information broadcast, RRC may be involved in Non-Access Stratum (NAS) (on idle mode mobility management and service setup) as well as AS (on data transfer and RRM). In idle mode mobility, RRC may be used in paging, cell reselection and system selection.

Typically, when a new Radio Access Technology (RAT) is standardized, this is done by also introducing a separate Core Network catering for that RAT and 3GPP introduces mechanisms to move from one RAT to another RAT with minimal service interruption via the Core Network. Hence, in any case, moving from one RAT to another RAT means establishing a RRC connection towards the target RAT and removing the RRC connection from the source RAT, and because those RRC connections terminate in different logical nodes anchoring in different Core Networks (i.e., are completely separate UE connections), there is no possibility of synergy between them. This also implies a very high amount of signalling between the source and the target RAT, and higher risks of call drops.

Thus, when a UE moves from one RAT to another RAT, the UE needs to release the RRC connection in the source RAT and establish a new RRC connection in the second RAT. The RRC connection procedure is identical to the procedure happening when a UE initially connects to the second RAT. This procedure is quite intense from the control signaling load point of view, and it also adds a delay.

SUMMARY

Accordingly, there is a need for an improved Radio Resource Control (RRC) connection establishment technique in a wireless communication network.

According to a first aspect, a method of supporting Radio Resource Control (RRC) connection establishment in a wireless communication network is provided. The method comprises setting up context information during a first RRC connection establishment procedure. The first RRC connection establishment procedure is to establish a first RRC connection towards a radio access network element of the wireless communication network implementing a first Radio Access Technology (RAT). The context information is associated with a wireless communication device of the wireless communication network. The context information is usable for a second RRC connection establishment procedure to establish a second RRC connection towards a radio access network element of the wireless communication network implementing a second RAT.

RAT, Radio Access Network Element

In this way, the context information set up during the first RRC establishment procedure can be reused for the second RRC connection establishment procedure. As a consequence, the second RRC connection establishment procedure can be simplified.

The context information may be regarded as information in a radio access network element associated with an active wireless communication device. The information may contain the necessary information required to maintain the radio access network services towards the active wireless communication device. For example, at least one of state information of the wireless communication device, security information, and capability information of the wireless communication device may be included in the context information. Establishment of the context information may be completed in the radio access network element when the transition to active state for the wireless communication device is completed.

The term Radio Access Technology (RAT) may be understood as the underlying physical connection mechanism for a radio based communication network. The radio access network element may comprise or be configured as a base station of a radio access network.

The step of preparing may comprise receiving, by the radio access network element implementing the first RAT, the context information or information needed for setting up the context information.

The radio access network element implementing the first RAT may correspond to or may be different from the radio access network element implementing the second RAT.

If the radio access network element implementing the first RAT is different from the radio access network element implementing the second RAT, the method may comprise providing, by the radio access network element implementing the first RAT, the context information or information needed for setting up the context information to the radio access network element implementing the second RAT. In this way, the radio access network element implementing the second RAT can be informed about the context information or the information needed for setting up the context information by the radio access network element implementing the first RAT.

In one or more embodiments, the method may comprise providing the wireless communication device with information related to the establishment of the second RRC connection. In this way, the wireless communication device can be information about the information related to the establishment of the second RRC connection.

The method may comprise providing the information related to the establishment of the second RRC connection in a Downlink (DL) message of the first RRC connection establishment procedure. Alternatively, or additionally, the method may comprise providing the information related to the establishment of the second RRC connection via broadcast system information.

The information related to the establishment of the second RRC connection may comprise a cell identity of the cell associated with the radio access network element implementing the second RAT. Alternatively, or additionally, the information related to the establishment of the second RRC connection may comprise an identifier to be used when accessing the radio access network element implementing the second RAT. Alternatively, or additionally, the information related to the establishment of the second RRC connection may comprise access information for accessing the radio access network element implementing the second RAT. Alternatively, or additionally, the information related to the establishment of the second RRC connection may comprise information about conditions or trigger events indicating when to connect to the radio access network element implementing the second RAT. Alternatively, or additionally, the information related to the establishment of the second RRC connection may comprise security re-activation information for the second RRC connection establishment procedure such as nextHopChainingCount for the second RRC connection establishment procedure.

According to a second aspect, a method of initiating Radio Resource Control (RRC) connection establishment in a wireless communication network is provided. The method may comprise initiating, using context information, a second RRC connection establishment procedure. The second RRC connection establishment procedure is to establish a second RRC connection towards a radio access network element of the wireless communication network implementing a second Radio Access Technology (RAT). The context information is associated with a wireless communication device of the wireless communication network. The context information is set up during a first RRC connection establishment procedure. The first RRC connection establishment procedure is to establish a first RRC connection towards a radio access network element of the wireless communication network implementing a first RAT.

The step of initiating may comprise transmitting an RRC reestablishment message.

The method may comprise providing the radio access network element implementing the second RAT with a previous identifier of the wireless communication device. This previous identifier may be UE RRC context identifier informed by the former radio access network element (e.g. eNB)/RAT. The previous identifier of the wireless communication device may comprise at least one of Cell Radio Network Temporary Identifier (C-RNTI), a Physical Cell Identifier (PCI) and RAT category associated with the first RAT. Here, the term RAT category may correspond to the RAT type, e.g. LTE or a new radio access technology, and/or the release/capability of the first RAT.

According to a third aspect, a method of initiating Radio Resource Control (RRC) connection establishment in a wireless communication network is provided. The method comprises setting up context information during a first RRC connection establishment procedure. The first RRC connection establishment procedure is to establish a first RRC connection towards a radio access network element of the wireless communication network implementing a first Radio Access Technology (RAT). The context information is associated with a wireless communication device of the wireless communication network. The context information is usable for a second RRC connection establishment procedure. The second RRC connection establishment procedure is to establish a second RRC connection towards a radio access network element of the wireless communication network implementing a second RAT. The method further comprises initiating, using the context information, the second RRC connection establishment procedure to establish the RRC connection towards the radio access network element of the wireless communication network implementing the second RAT.

The method may comprise in parallel establishing the first RRC connection towards the radio access network element implementing the first RAT and the second RRC connection towards the radio access network element implementing the second RAT.

For example, establishing the first RRC connection towards the radio access network element implementing the first RAT and the second RRC connection towards the radio access network element implementing the second RAT in parallel may comprise establishing the first RRC connection towards the radio access network element implementing the first RAT and the second RRC connection towards the radio access network element implementing the second RAT simultaneously. The first RRC connection towards the radio access network element implementing the first RAT and the second RRC connection towards the radio access network element implementing the second RAT may also be started at different times but at least a portion of both may be established in parallel. The first RRC connection towards the radio access network element implementing the first RAT and the second RRC connection towards the radio access network element implementing the second RAT may also be started sequentially.

The method may comprise establishing the second RRC connection towards the radio access network element implementing the second RAT by using the context information.

The method may comprise maintaining the first RRC connection towards the radio access network element implementing the first RAT and the second RRC connection towards the radio access network element implementing the second RAT at the same time.

The method may comprise establishing the second RRC connection towards the radio access network element implementing the second RAT, if the first RRC connection towards the radio access network element implementing the first RAT is lost, e.g. released or failed. The term lost may include one or more or a Radio Link Failure (RLF) a Release or Handover failure or any other type of failure.

The method may comprise establishing the second RRC connection towards the radio access network element implementing the second RAT based on at least one of a trigger event and a network command. The network command may be made or issued by the radio access network element implementing the first RAT, for example.

The trigger event may comprise or be a Radio Link Failure (RLF) of the first RRC connection towards the radio access network element implementing the first RAT.

According to a fourth aspect, a computer program is provided. The computer program comprises program code portions for causing the steps of any one of the method aspects described herein to be performed, when the computer program is run on a computer system or on one or more computing devices. The computer program may be stored on a computer-readable recording medium or may be downloadable as a signal.

According to a fifth aspect, a radio access network element for supporting Radio Resource Control (RRC) connection establishment in a wireless communication network is provided. The radio access network element comprises a set-up component. The set-up component is configured to set up context information during a first RRC connection establishment procedure. The first RRC connection establishment procedure is to establish a first RRC connection towards a radio access network element of the wireless communication network implementing a first Radio Access Technology (RAT). The context information is associated with a wireless communication device of the wireless communication network. The context information is usable for a second RRC connection establishment procedure. The second RRC connection establishment procedure is to establish a second RRC connection towards a radio access network element of the wireless communication network implementing a second RAT.

The radio access network element may be or comprise at least one of the radio access network element implementing the first RAT and the radio access network element implementing the second RAT.

The radio access network element may be configured to perform the method of any of the method steps described herein with respect to the first aspect. The radio access network element may comprise or be configured as or be part of a radio base station, a radio network controller (RNC), a nodeB, an eNodeB or a 5G base station.

According to a sixth aspect, a wireless communication device for initiating Radio Resource Control (RRC) connection establishment in a wireless communication network is provided. The wireless communication device comprises an initiating component. The initiating component is configured to initiate, using context information, a second RRC connection establishment procedure to establish a second RRC connection towards a radio access network element of the wireless communication network implementing a second Radio Access Technology (RAT). The context information is associated with a wireless communication device of the wireless communication network. The context information is set up during a first RRC connection establishment procedure. The first RRC connection establishment procedure is to establish a first RRC connection towards a radio access network element of the wireless communication network implementing a first RAT.

The wireless communication device may be configured to perform the method of any of the method steps described herein with respect to the second aspect.

According to a seventh aspect, a wireless communication system is provided. The wireless communication system comprises the radio access network element as described herein and one or more wireless communication devices such as user equipments (UEs). The wireless communication system may be configured to perform the steps of any one of the method aspects as described herein with respect to the third aspect.

In general, the steps of any one of the method aspects described herein may equally be performed in one or more suitable components, devices or units, e.g. in suitable components of the radio access network element, the wireless communication device and/or the wireless communication system.

BRIEF DESCRIPTION OF THE DRAWINGS

In the following, the present disclosure will be further described with reference to exemplary embodiments illustrated in the Figures, in which.

DETAILED DESCRIPTION

In the following description, for purposes of explanation and not limitation, specific details are set forth, such as specific network topologies including particular network nodes, in order to provide a thorough understanding of the present disclosure. It will be apparent to one skilled in the art that the present disclosure may be practiced in other embodiments that depart from these specific details. For example, although the present disclosure is mainly described with reference to Long Term Evolution (LTE) as a specific example for a wireless communication network, the present disclosure may be practiced in any network to which mobile or stationary users using a corresponding user equipment (UE) may attach. For example, the present disclosure is applicable to other cellular networks such as Global System for Mobile Communications (GSM) networks, Universal Mobile Telecommunications System (UMTS) networks, LTE-Advanced (LTE-A) networks, 5G networks, WiFi networks or to Wireless Local Area Network (WLAN) or similar wireless networks and a combination thereof.

Those skilled in the art will further appreciate that functions explained herein below may be implemented using individual hardware circuitry, using software functioning in conjunction with a programmed microprocessor or a processor of a general purpose computer, using an Application Specific Integrated Circuit (ASIC) and/or using one or more Digital Signal Processors (DSPs). It will also be appreciated that when the present disclosure is described as a method, the present disclosure may also be embodied in a computer processor (e.g. embodied as one of the aforementioned types) and a memory coupled to the processor, wherein the memory is encoded with or stores one or more programs to cause the processor to perform the methods disclosed herein when executed by the processor.

Figure 1:
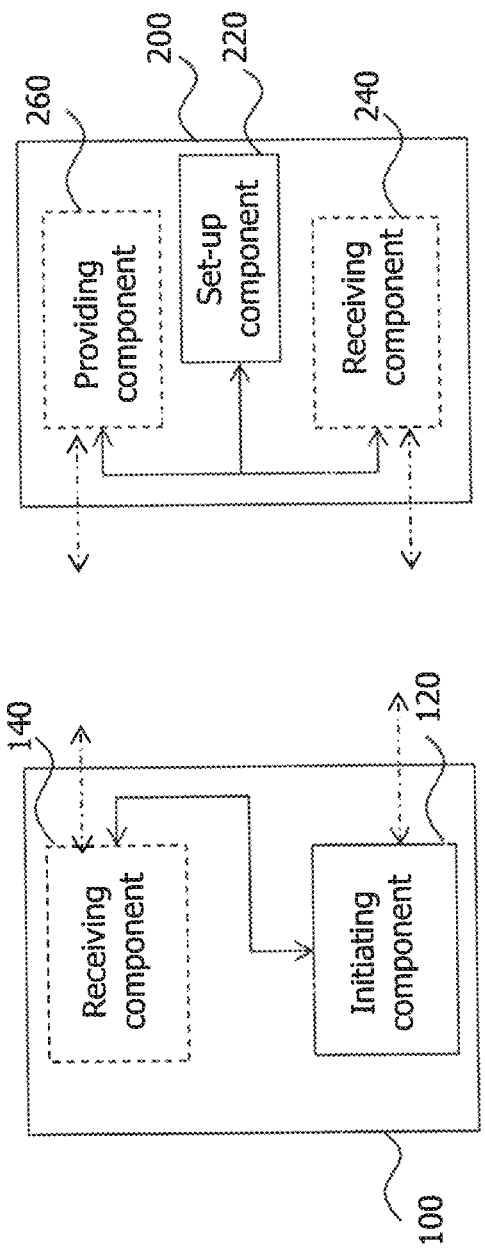
FIG. 1 is a schematic illustration of an embodiment of a system comprising a device embodiment of a wireless communication device and a device embodiment of a radio access network element.

FIG. 1 shows an embodiment of a wireless communication system 10 comprising an embodiment of a wireless communication device 100 and an embodiment of a radio access network element 200.

The wireless communication device 100 is adapted for initiating Radio Resource Control (RRC) connection establishment in a wireless communication network. The wireless communication device 100 may be, comprise or be part of a user equipment (UE) operable in accordance with LTE or LTE-A.

The wireless communication device 100 comprises an initiating component 120 and may further comprise a receiving component 140. The initiating component 120 is configured to initiate, using context information, an RRC connection establishment. The context information is associated with the wireless communication device 100 of the wireless communication network. The context information is set up during a first RRC connection establishment procedure. The first RRC connection establishment procedure is to establish a first RRC connection towards a radio access network element, e.g. radio access network element 200, of the wireless communication network implementing a first Radio Access Technology (RAT). More particularly, the initiating component 120 is configured to initiate, using the context information, a second RRC connection establishment procedure to establish a second RRC connection towards a radio access network element, e.g. radio access network element 200 or another radio access network element, of the wireless communication network implementing a second RAT. The receiving component 140 may be configured to receive information, e.g. from the radio access network element 200.

The radio access network element 200 is adapted for supporting Radio Resource Control (RRC) connection establishment in a wireless communication network. The radio access network element 200 may be, comprise or be part of an eNodeB operable in accordance with LTE or LTE-A.

The radio access network element 200 comprises a set-up component 220 and may further comprise a receiving component 240 and/or a providing component 260. The set-up component 220 is configured to set up context information during a first RRC connection establishment procedure. The first RRC connection establishment procedure is to establish a first RRC connection towards a radio access network element, e.g. radio access network element 200 or another radio access network element, of the wireless communication network implementing a first Radio Access Technology (RAT). The context information is associated with a wireless communication device 100 of the wireless communication network. The context information is usable for a second RRC connection establishment procedure. The second RRC connection establishment procedure is to establish a second RRC connection towards a radio access network element, e.g. radio access network element 200 or another radio access network element, of the wireless communication network implementing a second RAT. The receiving component 240 may be configured to receive information, e.g. from wireless communication device 100. The providing component 260 may be configured to provide information, e.g. to the wireless communication device 100.

The wireless communication device 100 and the radio access network element 200 will be further described below with respect to FIG. 2.

Figure 2:
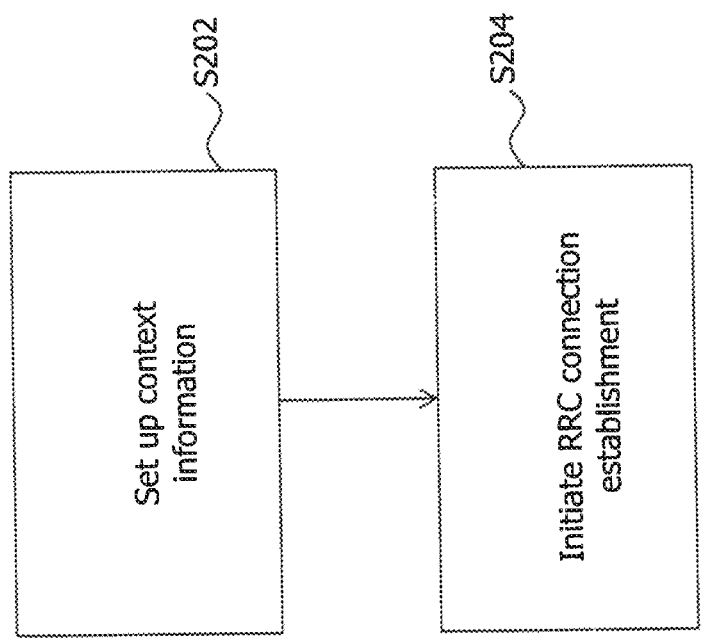
FIG. 2 is a flowchart illustrating a method embodiment performed in the system of FIG. 1.

FIG. 2 shows a method embodiment which can be implemented in the wireless communication system 10 of FIG. 1. In more detail, the first step S202 of FIG. 2 shows a method embodiment which can be implemented in the radio access network element 200 of FIG. 1 and the second step S204 of FIG. 2 shows a method embodiment which can be implemented in the wireless communication device 100 of FIG. 1.

The method of FIG. 2 is for initiating Radio Resource Control (RRC) connection establishment in a wireless communication network.

In step S202, context information is set up during a first RRC connection establishment procedure. The first RRC connection establishment procedure is to establish a first RRC connection towards a radio access network element, e.g. radio access network element 200 or another radio access network element, of the wireless communication network implementing a first Radio Access Technology (RAT). The context information is associated with a wireless communication device 100 of the wireless communication network. The context information is usable for a second RRC connection establishment procedure. The second RRC connection establishment procedure is to establish a second RRC connection towards a radio access network element, e.g. radio access network element 200 or another radio access network element, of the wireless communication network implementing a second RAT. For example, the set-up component 220 is configured to set up the context information during the first RRC connection establishment procedure.

In step S204, the second RRC connection establishment procedure is initiated using the context information. The second RRC connection establishment procedure is to establish the RRC connection towards the radio access network element, e.g. radio access network element 200 or another radio access network element, of the wireless communication network implementing the second RAT. For example, the initiating component 120 is configured to initiate, using the context information, the second RRC connection establishment procedure.

The present disclosure is described in the following mainly within the context of LTE. It should be understood that the problems and solutions described herein are equally applicable to wireless access networks and user equipments (UEs) implementing other access technologies and standards. Thus, LTE is used as an example technology where the proposed technique is suitable, and using LTE in the following therefore is useful for understanding the technique described herein. Thus, in the following, for sake of explanation rather than limitation, the radio access network element 200 will be referred to as eNB 200 to illustrate, by way of example, that the radio access network element 200 can be configured as a base station and that the technique proposed herein can be used and implemented in LTE. Similarly, the wireless communication device 100 will be referred to as UE 100 to illustrate, by way of example, that the technique proposed herein can be used and implemented in LTE.

Similarly, the context information will be referred to as eNB UE context. The eNB UE context may be understood in the sense of 3GPP TS 36.401 V12.2.0 (2015-03) as a block of information in an eNB associated with one active UE. The block of information may contain the necessary information required to maintain the evolved Universal Mobile Telecommunications System (UMTS) terrestrial radio access network (E-UTRAN) services towards the active UE. For example, one or more or UE state information, security information, UE capability information and the identities of the UE-associated logical S1-connection may be included in the eNB UE context. Establishment of the eNB UE context may be considered completed when the transition to active state for a UE is completed or in target eNB after completion of handover to E-UTRAN. The Evolved UMTS Universal Terrestrial Radio Access (E-UTRA) is the air interlace of 3GPP's Long Term Evolution (LIE) upgrade path for mobile networks. It is also referred to as the 3GPP work item on the LTE also known as the Evolved Universal Terrestrial Radio Access (E-UTRA) in early drafts of the 3GPP LTE specification. E-UTRAN is the combination of E-UTRA, UEs and eNBs.

Further exemplary details regarding UE 100, eNB 200, the system 10 comprising UE 100 and eNB 200, and the methods performed therein are described below with respect to FIGS. 5 to 9. Before these details are explained, the general concept of RRC connection establishment is explained with respect to FIGS. 3 and 4.

Figure 3:
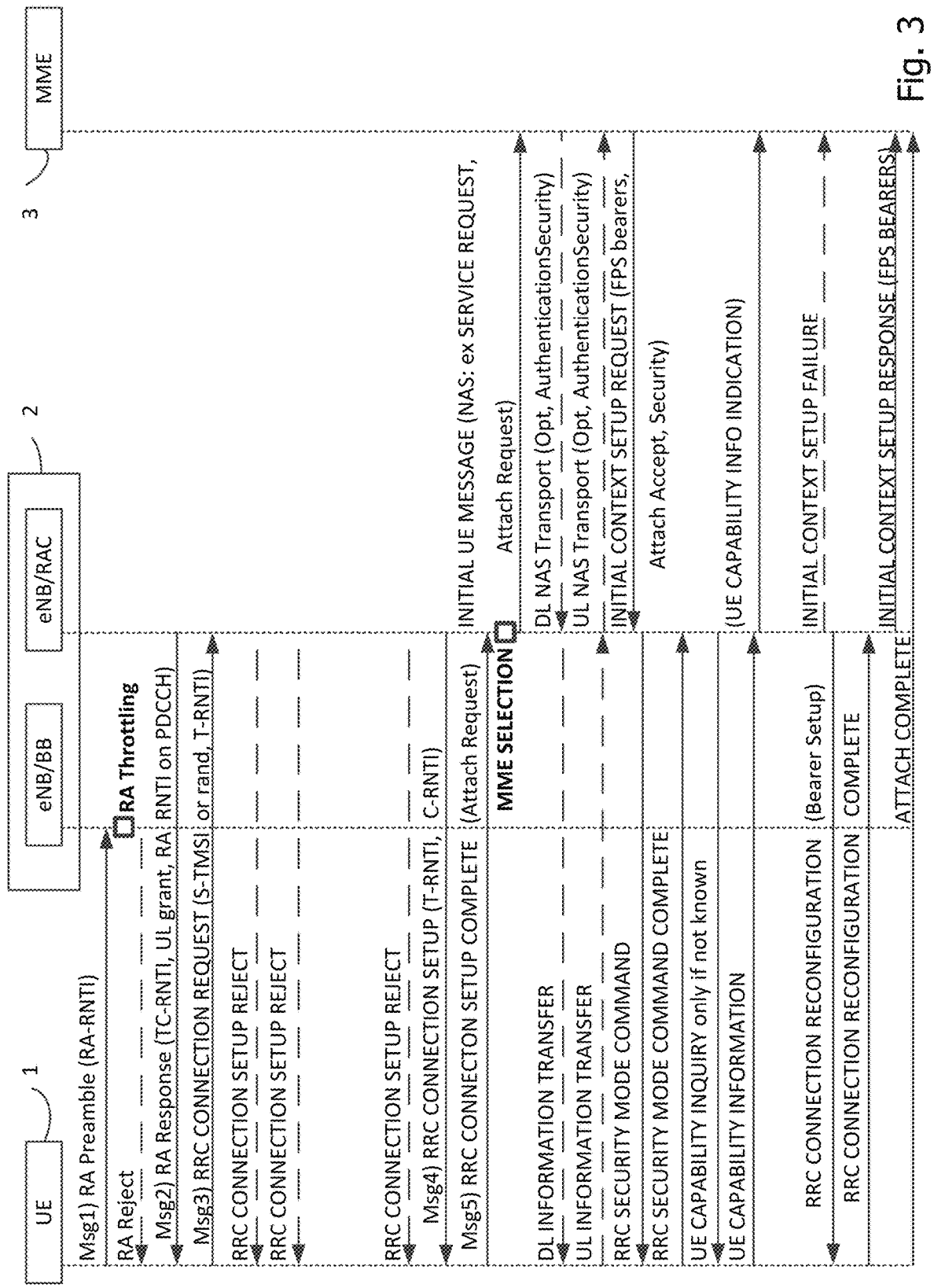
FIG. 3 is a flowchart of an LTE RRC connection setup and attach procedures.
Figure 4:
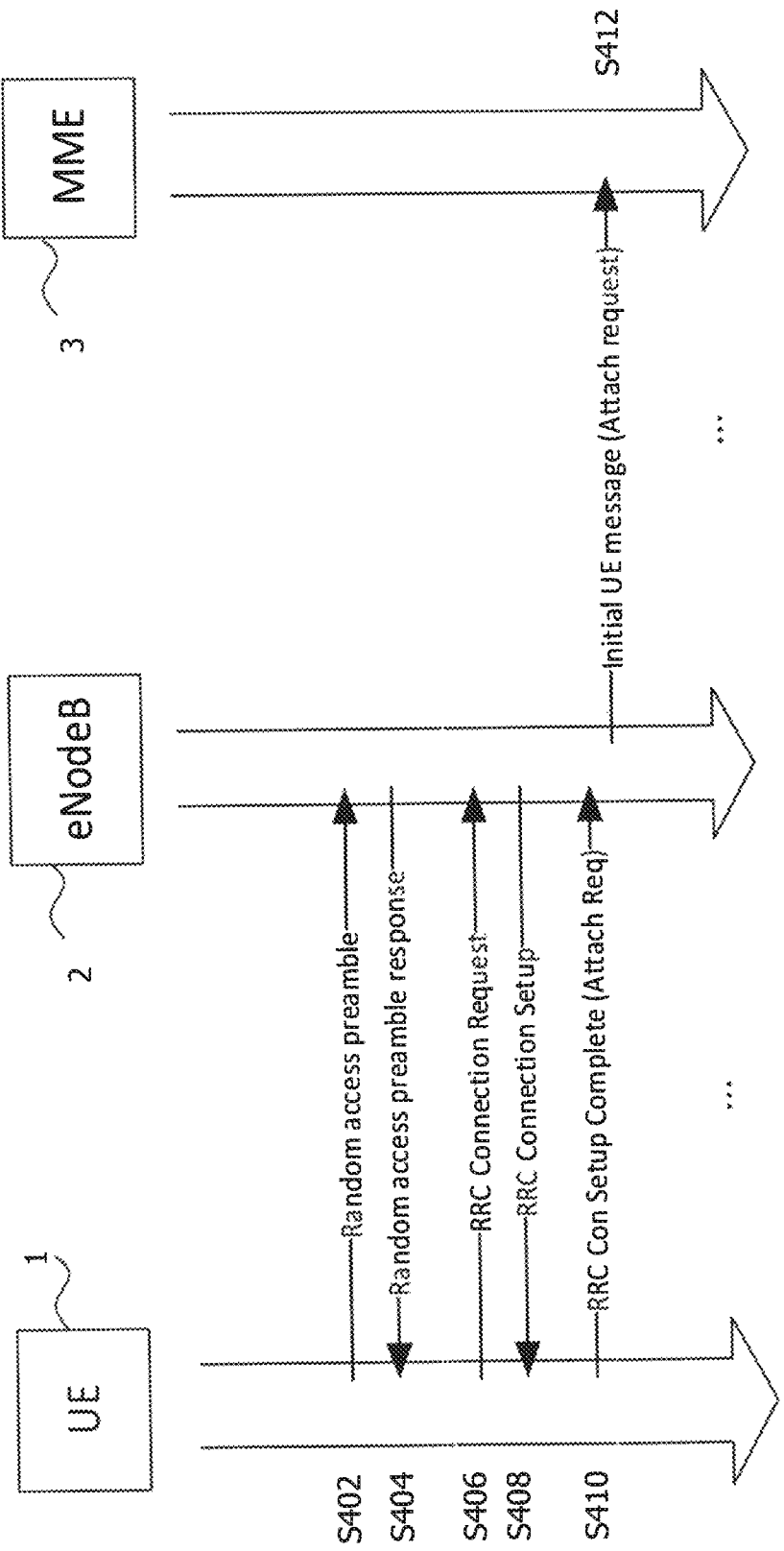
FIG. 4 is a flowchart of an RRC connection establishment for the "Attach" case in E-UTRAN.

As shown in FIGS. 3 and 4, for RRC connection establishment between UE 1 and eNB 2, UE 1 first sends a random access preamble to eNB 2 (see step S402). In step S404, eNB 2 responds to UE 1 with a random access preamble response. In step S406, UE 1 sends a RRC connection request message to eNB 2. The eNB 2 responds either with a RRC connection setup reject message as shown in FIG. 3 or with a RRC connection setup confirm message as shown in FIG. 4 (see step S408). In the latter case, UE 1 responds with a RRC connection setup complete message to indicate that the RRC connection is established (step S410). In step S412, eNB 2 transmits an initial UE message to MME 3.

When evolving the current LTE system to add a new radio access technology (which is called NX in the following as a place holder), one arrives at multiple Radio Access Technologies (RATs). In this case, one could have only one UE connection towards the Core Network (CN) and that connection may contain both RAT components, i.e. the existing RAT (E-UTRA) and the new RAT (NX). The CN could be common or be mapped to one or more common slices and/or instances of CN functions or entities. That is, when evolving LTE with Nx in 5G, the assumption can be assumed to have only one connection from the radio access network (RAN) to the core network (CN). Today, when a UE moves from one RAT to another (e.g. from 3G/GSM, WDCMA to 4G/LTE) the UE has to release the RRC connection in the source RAT and to establish a new RRC connection in the target RAT. This is a long and complex procedure with a risk for failure. Further, using the RRC connection procedure described with respect to FIGS. 3 and 4 for both RATs leads to a high signaling load.

By means of the methods described above with respect to FIG. 2, the possibility is enabled for UE 100 which has or is establishing a first RRC connection, e.g. an RRC connection in E-UTRAN or NX, to establish a second RRC connection towards a second RAT (e.g. in NX or E-UTRAN) while maintaining a single and already existing connection to the CN. Furthermore, by the UE context set up earlier, the RRC establishment to the second RAT is enhanced so that the RRC connection may be established in shorter time. Further, the signaling procedure may be simplified for the second RRC establishment by using the UE context known at the network side. E-UTRAN and NX may be tightly integrated to enhance user performance, for instance. For example, UE 100 may be connected to one Core Network by one evolved S1 association, supporting both radio access technologies. In this way, UE 100 may be enabled to establish simultaneous RRC connections towards two different RATs, one towards E-UTRAN and another towards NX, while keeping a common anchoring and control point on the NW side.

In consequence, UE 100 can be adapted to maintain two RRC connections at the same time, each one via a different RAT. Connection establishment via the second RAT is facilitated by re-using information used for the connection via the first RAT and/or already being communicated via the first RAT connection. Therefore, the signaling load on the air interface of the second RAT and the processing capacity in UE 100 are low, and the change in the connections between the RANs and UE 100 is transparent to the CN.

The connection via the first RAT may be simultaneously established with respect to the connection via the second RAT or may have been terminated before establishment of connection via the second RAT, e.g. due to radio link failure (RLF). The connection via the first RAT and the connection via the second RAT may use the same radio bearer or may use a different radio bearer (e.g. one uses a default bearer). The connection between the RAN and the CN may also use the same bearer (for example, as a default scenario) or may use separate bearers. The base station (BS) for the connection via the first RAT may be the same as or different from the BS for the connection via the second RAT (in this case, there is communication between BSs regarding UE context information). In the first scenario, UE 100 can connect to eNB 200 for connection via the first and the second RAT. In the second scenario, UE 100 may connect to eNB 200 for connection via the first RAT and may connect to another eNB for connection via the second RAT.

To explain further, in a first case, there can be separate RRC entities for different RATs in one eNB, e.g. in eNB 200. For example, UE 100 separately sends RRC message(s) to different RATs to set up the RRC connection, e.g. one RRC connection (set up) request to first RAT and RRC connection re-establishment request to second RAT. Then, the UE context may be created and transferred for the second RAT's RRC. In case the eNBs implementing the first RAT and second RAT are different, the benefit is that once UE context related information has been sent to one RAT, the UE context related information does not have to be sent to another RAT.

Alternatively, in a second case, there can be a common RRC layer for different RATs, e.g. it can reside in a single (master) node. In other words, there may be a common RRC (which may reside in a single node if there are multiple nodes) and a common RRC state machine. Then, there a single RRC layer and RRC connection for both RATs may be set up together. In that case, only one physical (PHY) link (the first one) may be used for the set-up. In other words, RRC message exchange with the first RAT would be enough to set up the RRC connection with both RATs (without any need for RRC connection re-establishment message exchange). In a first variant of the first case, it is conceivable that the UE context for the second RAT can be created by the first RAT's RRC without involving the second RAT's RRC in the context set-up process initially. In a second variant of the first case UE context for the second RAT can be created by the first and second RAT's RRCs' involvement together. In a third variant of the first case, UE context for the second RAT can be created by the second RAT's RRC, transparent to the first RAT's RRC.

The UE context can be created (set up) for the second RAT within the RRC of the first RAT. Alternatively, the UE context can be created (set up) for the second RAT within the RRC of the second RAT (based on the information needed for setting up the (UE) context).

Figure 5:
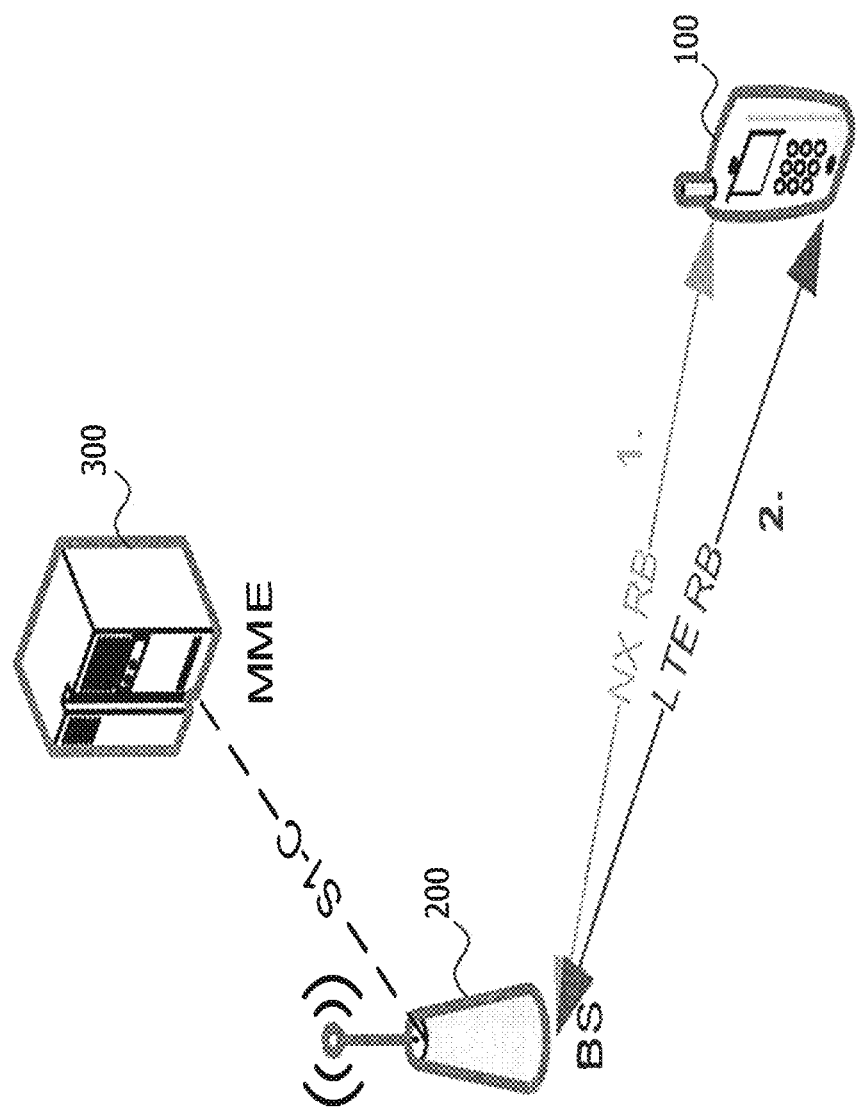
FIG. 5 is a possible implementation of the embodiment of the system of FIG. 1.
Figure 6:
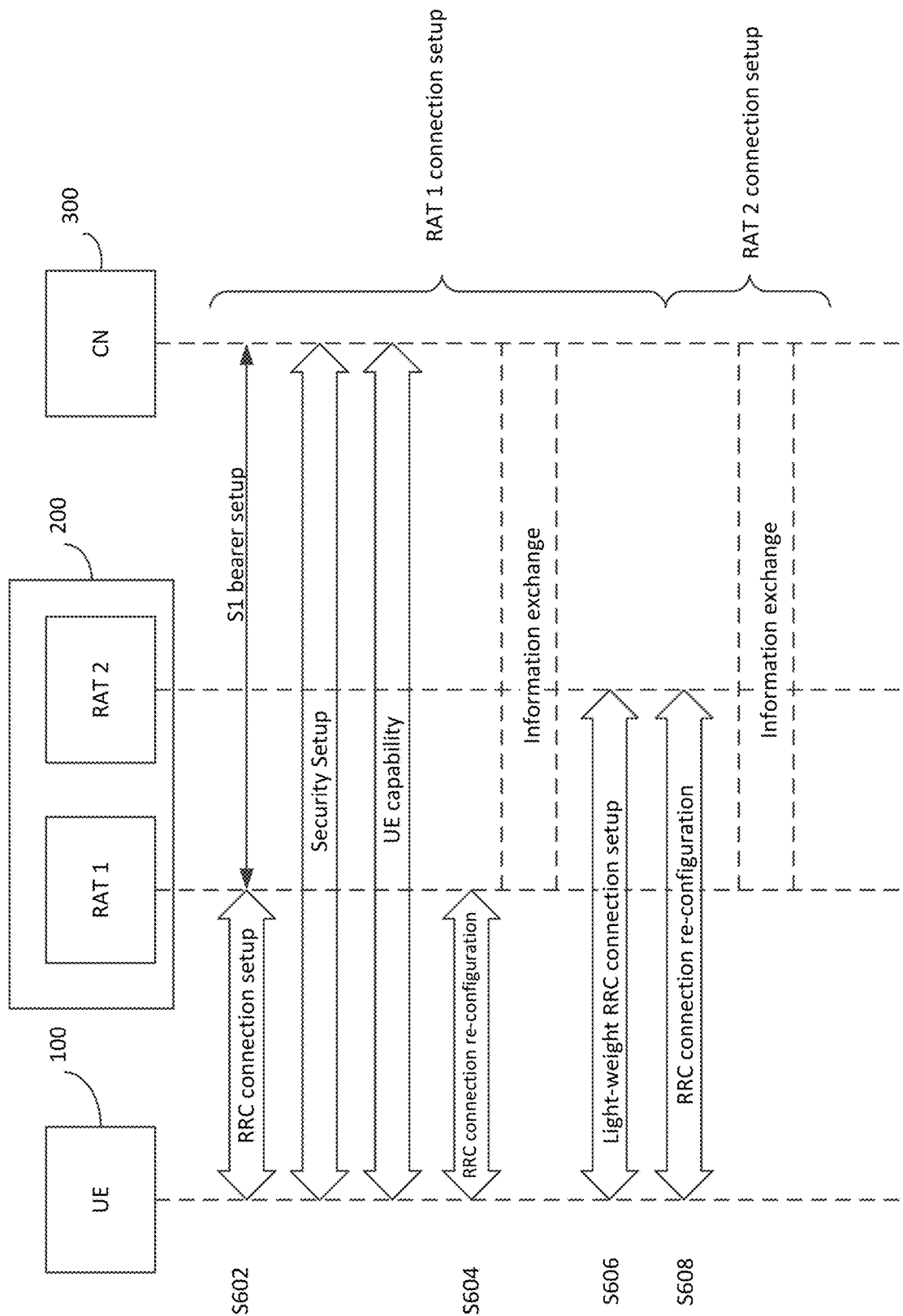
FIG. 6 is a flowchart illustrating a control signaling flow that may be used in the method of FIG. 2.

In more detail, as illustrated in FIGS. 5 and 6, the following may be performed by UE 100 and/or eNB 200. For illustration rather than limitation, a first RAT (RAT1) and a second RAT (RAT2) are supported by the same eNB, i.e. eNB 200, in FIGS. 5 and 6. However, this is not to be understood as limiting. Rather, RAT1 and RAT2 may be supported by different eNBs, e.g. RAT1 by eNB 200 and RAT2 by a different eNB. Thus, the present disclosure is equally applicable independent of whether one BS implements both RATs or whether the two RATS are implemented separately.

In step S602, UE 100 initiates the RRC connection establishment procedure to establish an RRC connection in the first RAT. This step may also be referred to as RRC connection setup. In other words, the RRC connection establishment procedure may start by UE 100 initiating the RRC connection establishment procedure towards one of the RATs (E-UTRA or NX) by sending a random access preamble as shown in FIGS. 3 and 4.

In step S602, one connection via first RAT is established. The second connection via second RAT can be added later. Establishment of second connection can be triggered by an event like, for example, RLF of first connection or the NW may request the UE to establish the second connection via the second RAT, e.g. in case the UE is in coverage.

Before performing RRC connection establishment towards the second RAT, the following is performed. The BS of the first RAT is informed about UE context information (e.g. UE state information, security information, UE identities, UE radio capabilities and the like). If there are two BSs for the first RAT and the second RAT, the BS for the first RAT informs the BS for the second RAT about this information.

To explain further, in the response to successfully finalize the RRC connection establishment procedure in the first RAT (i.e., RRC connection establishment procedure successfully ends with the sending of the response message), the network (NW), e.g. eNB 200, may indicate to UE 100 if, when accessing the second RAT, UE 100 should use a second procedure to establish the connection in the second RAT or the same procedure as used for the first RAT. The second procedure may be a signaling load reduced, called light-weight, RRC connection setup as illustrated in step S606. This indication may be provided in a downlink message e.g., during the RRC connection procedure. The network may provide different information to UE 100 such as the conditions by which UE 100 will connect to the second RAT, and/or how to access the second RAT. For example, the NW may further provide UE 100 with configuration parameters, IDs, bearer IDs, and other relevant information to access the second RAT, e.g. PHY/MAC/RRC layer parameters and other variables (access information may include second RAT C-RNTI, second RAT security algorithm identifiers, dedicated second RAT Random Access Channel (RACH) preamble or resources for access second RAT, second RAT SIBs, second RAT spectrum etc.).

To explain further, when informing UE 100, the BS of first RAT or second RAT may inform UE 100 about the cell identity of the cell associated with second RAT, which can be either explicitly communicated (same BS/different BSs) or can be derived from other information (same BS). This information can be conveyed in dedicated signaling or via system information broadcast. Optionally, UE identifier to be used for second RAT can be provided, so that the BS can associate already available UE context information with UE 100. The UE identifier can be sent to UE 100 prior to the connection set-up via the second RAT and/or UE 100 can include its previous UE identifier when the UE 100 sends the connection set-up message to the BS for the second RAT. Either measure may help the BS for second RAT to retrieve information on UE 100. This information may be conveyed prior to initiation of the connection establishment, e.g. in the RRC reconfiguration message (step S604) or any earlier RRC message or system information block (SIB).

As stated above, all the necessary information to access the second RAT may be provided during the RRC connection establishment process in a DL message, or at any time after successful completion of the RRC connection establishment with the first RAT. For example, the network can provide a UE RRC context identifier in advance so that the UE can send this identifier to the next eNB/RAT when it sends light-weight RRC connection setup request. The network can also use this identifier to find/fetch the UE context associated to the UE. The necessary information (or parts of it) could also be distributed via system information.

As mentioned above, establishment of the second connection can be triggered by a trigger event like RLF of first connection or a network command. Conditions/trigger events when to connect via the second RAT may include an indication that higher data rate desired, an indication that more reliability of connection is desired, an indication that RLF is detected on the first connection, and the like. To give an example, the network command may be made by the first RAT node (e.g., for setting-up dual connectivity).

Regarding the RLF in LTE, when RLF happens, UE 100 first tries to recover. If UE 100 does not recover with another cell, UE 100 may go to the RRC idle state. If UE 100 recovers with a cell of a second RAT, UE context may still stay in the LTE cell. Thus, if the first connection is lost, the second connection can be established for seamless connection to the network.

Returning to FIG. 6, UE 100 initiates a RRC connection establishment procedure to establish an RRC connection in the second RAT. When UE 100 establishes the RRC connection towards the second RAT, UE 100 may start light-weight RRC connection towards the second RAT (see step S606). Light-weight RRC connection towards the second RAT may be initiated if the NW configured UE 100 with it. In the exemplary illustration of FIG. 6, UE 100 starts RRC connection re-establishment as the light-weight RRC connection setup in step S606. Connection establishment from the UE to the BS of the second RAT can be performed using the RRC reestablishment message in LTE, for example. In the message the UE identifier or the UE identifier and the cause (as in RRC connection re-establishment message) or the UE identifier, the cause and the context (capabilities and/or attributes) that were not sent and/or retrieved by the second RAT may be included. The UE identifier can be C-RTNI and previous cell ID. To explain further, light-weight RRC connection establishment of step S606 may include one or more of the following messages: Light-weight RRC connection setup request (from UE to NW), Light-weight RRC connection setup message (from NW to UE), and Light-weight RRC connection setup complete (from UE to NW). For example, light-weight RRC connection establishment of step S606 may include the complete message sequence of Light-weight RRC connection setup request (from UE to NW), Light-weight RRC connection setup message (from NW to UE), and Light-weight RRC connection setup complete (from UE to NW). There may be also one or more prior messages that can include information to be used later for Light-weight RRC connection setup request.

The second RAT context may be created within the first RAT connection setup, without or with limited involvement of the second RAT (node). This enables context fetch of at least a part of the context related to the second RAT (node) which is stored at the first RAT (node) until the second RAT connection is physically set up (due to security reasons or simply to save memory, etc.). The UE identifier (e.g. C-RTNI and source cell ID) included in the light-weight RRC connection request message can help the second RAT (node) to fetch the (remaining) second RAT context from the first RAT (node). That is, the UE context for second BS can be prepared when context for first BS is generated such that the establishment of second connection is facilitated by already available information.

There are several options of how UE 100 can determine whether it can use a light-weight procedure as illustrated in step S606 or not.

According to a first embodiment, the network may indicate if the UE 100 can or should use this method to access the second RAT or if UE 100 should use the same method as used for the RRC connection establishment in the first RAT. This embodiment can be implemented in various variants, all of which can be suitably combined with each other.

According to a first variant, the NW may inform UE 100 during radio access in the second RAT if light-weight RRC connection establishment is enabled. According to a second variant, the second RAT may broadcast if light-weight RRC connection establishment is allowed. According to a third variant, the network could also indicate whether light-weight RRC connection establishment should be used when specifically accessing certain nodes within the second RAT. Thus, the network could provide, for example, a list of network nodes in which UE 100 could access using the light-weight RRC connection establishment procedure. This means that UE 100 would use the first method to access those nodes not listed by the network. In a fourth variant, the network could indicate whether this second method should be used only when an RRC connection towards one of the RATs is already or being established, or whether this second method should be used until further notice i.e., until another DL message to disable this second method is sent by the network (e.g., in the RRC Connection Release, RB reconfiguration), or until certain conditions are triggered (e.g., tracking area update, UE establishing a connection in a different RAT e.g., UTRAN, security failure, etc.).

Alternatively to the methods above in which the network indicates how and if the UE 100 is allowed to access the second RAT, in a second embodiment, the second procedure to establish an RRC connection towards a second RAT may be mandated under certain conditions. In this case, UE 100 would always use this method. For example, UE 100 may be mandated to always access the second RAT using a second procedure e.g., a light-weight RRC connection procedure according to step S606 if UE 100 had a RRC connection in the first RAT.

In one implementation, when UE 100 starts the RRC connection establishment in the second RAT, UE 100 may follow the procedure indicated by the network unless mandated by the standards.

The embodiments and variants mentioned above can be implemented in isolation or in conjunction with each other, e.g. they are all independent and the use of one does not necessarily exclude other.

Upon a successful completion of the light-weight RRC connection signaling, UE 100 can be configured with new radio bearers, e.g., by means of RRC connection reconfiguration (see step S608). In addition, the UE context (e.g., UE state information, security information, UE identities, and UE radio access capabilities) related to the second RAT can be updated or completed following the light-weight RRC connection setup. If UE 100 has previously received nextHopChainingCount as defined in 3GPP TS 36.311, the step S608 might not be needed but RRC reconfiguration (that configures not only signaling radio bearers but also data radio bearers) can be handled together with light-weight RRC connection setup message from eNB to UE.

By way of the above, light-weight RRC connection setup to a second network in a multi-RAT setup is enabled.

In cases where the first RAT and the second RAT are not co-located within the same logical node (e.g., eNB 200), the first and the second RAT may exchange control information between each other via an internal NW interface (e.g., X2 or S1) or OAM, in order to coordinate light-weight RRC connection establishment. Interactions between RAN and CN (e.g. Evolved Packet Core (EPC)) 300, i.e. in AS and NAS, are explained further in the following. It is assumed the EPC does not need to be aware that the UE is connected via two different RRC connections over the LTE and NX RATs. Whether there is a need for an exchange of information between eNB 200 and MME of EPC 300 at establishment of the second RRC connection would depend on that second RRC connection corresponding to new radio access bearers or not (and in particular if a default bearer is needed on the second RAT in case of separate bearers) or if any EPC-relevant information needs to be updated once UE 100 is connected to the second RAT. There could be reasons to contact EPC 300 e.g. to provide information used for charging purposes when the second RAT is used, legal aspects like Lawful Intercept or Security related aspects inherent to the second RAT. In case of split bearers, the MME would not notice the establishment of a second RAT (similar to split bearers in Dual Connectivity).

When establishing the S1 UE association, the S1AP Initial UE Message may contain the RRC establishment cause of the first established RRC connection. It may be possible to introduce an eNB-triggered S1AP procedure (similar to existing S1AP UE Context Modification, which today can only be triggered by the MME) to update the UE context in the MME when the second RRC connection is established, but only if the MME would have to become aware of UE context information related to having two RRC connections (that would depend on the functional characteristics of NX, which are not yet completely defined). Otherwise, such a procedure would not be needed. If the connection on the second RAT implies at least one new radio access bearer towards the EPC, similar signaling as in LTE Initial Context Setup may have to be executed over S1.

For a UE 100 with two simultaneous RRC connections mapping towards one S1 association towards the MME, the NW should instruct the UE 100 about configuration of signaling radio bearers (SRBs) on the respective RRC connections. For example, how NAS PDUs should be carried once both RRC connections are operational (the first UL NAS PDU during Attach will always have to be carried during RRC connection establishment in the first RAT of course). It would be possible to either adopt duplication, to increase robustness, or to use the SRBs on the two RRC connections for different purposes.

Figure 7:
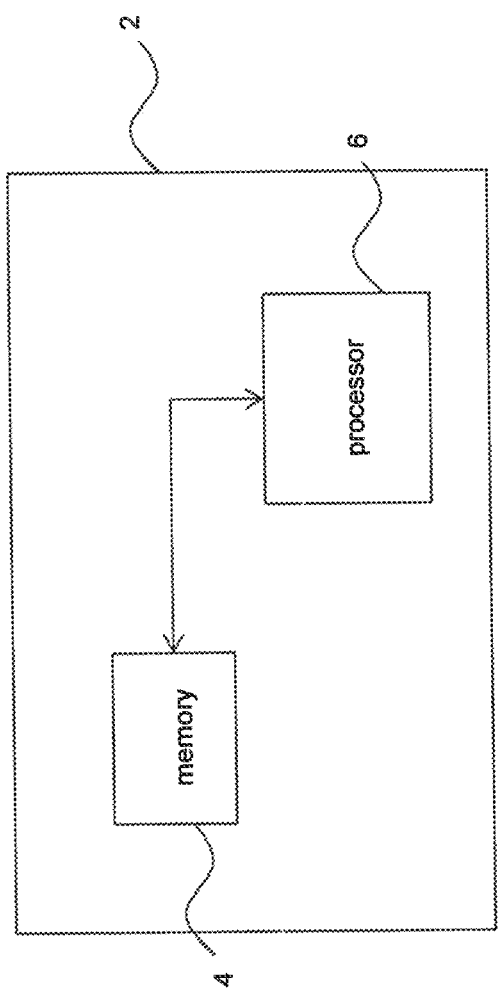
FIG. 7 is a block diagram schematically illustrating an embodiment of a radio access network element or a wireless communication device.

The details explained above with respect to FIGS. 1 to 6 may be summarized with respect to FIG. 7. FIG. 7 is a block diagram schematically illustrating a device embodiment of a network element 2 for supporting Radio Resource Control (RRC) connection establishment in a wireless communication network.

By way of example, the network element 2 is described to implement the functionalities of the radio access network element 200 according to the embodiment of FIG. 1. The radio access network element 2 comprises a memory 4 and a processor 6 which may be coupled to one another. The radio access network element may further comprise an optional interface which may be coupled to the processor 6. The memory 4 contains control instructions executable by the processor 6. The processor 6 is configured to set up context information during a first RRC connection establishment procedure. The first RRC connection establishment procedure is to establish a first RRC connection towards a radio access network element of the wireless communication network implementing a first Radio Access Technology (RAT). The context information is associated with a wireless communication device of the wireless communication network. The context information is usable for a second RRC connection establishment procedure to establish a second RRC connection towards a radio access network element of the wireless communication network implementing a second RAT. The interface may be configured to carry out any communication with other components of the communication network. For example, the interface may transmit information to other components of the communication network and/or may receive information from other components of the communication network.

Alternatively, FIG. 7 is a block diagram schematically illustrating a device embodiment of a network element 2 for initiating Radio Resource Control (RRC) connection establishment in a wireless communication network.

In this case, the network element 2 is described to implement the functionalities of the wireless communication device 100 according to the embodiment of FIG. 1. The radio access network element 2 comprises a memory 4 and a processor 6 which may be coupled to one another. The radio access network element may further comprise an optional interface which may be coupled to the processor 6. The memory 4 contains control instructions executable by the processor 6. The processor 6 is configured to initiating a RRC connection establishment procedure using context information. The context information is associated with a wireless communication device of the wireless communication network. The context information is set up during a first RRC connection establishment procedure to establish a first RRC connection towards a radio access network element of the wireless communication network implementing a first Radio Access Technology (RAT). The processor 6 is configured to initiate, using the context information, a second RRC connection establishment procedure to establish a second RRC connection towards a radio access network element of the wireless communication network implementing a second RAT. The interface may be configured to carry out any communication with other components of the communication network. For example, the interface may transmit information to other components of the communication network and/or may receive information from other components of the communication network.

Figure 8:
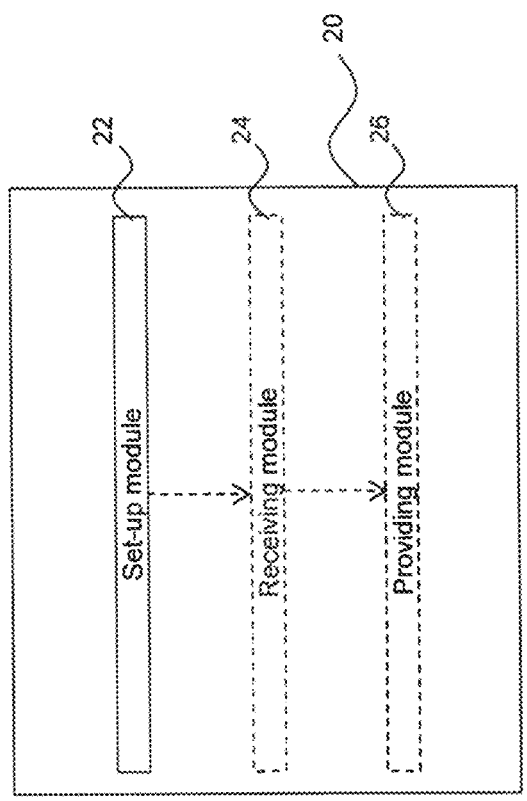
FIG. 8 is a block diagram schematically illustrating a further embodiment of a radio access network element.

FIG. 8 shows a functional block diagram of a network element 20 configured in accordance with the principles of the disclosure as described above. The functional blocks of the network element 20 may be implemented by hardware, software, or a combination of hardware and software to carry out the principles of the disclosure. It is understood by a person skilled in the art that the functional blocks described in FIG. 8 may be combined into one or more blocks or separated into sub-blocks to implement the principles of the disclosure as described above. Therefore, the description herein may support any possible combination or separation or further definition of the functional blocks described herein.

The radio access network element 20 of FIG. 8 is for supporting Radio Resource Control (RRC) connection establishment in a wireless communication network. The network element 20 comprises a set-up module 22 for setting up context information during a first RRC connection establishment procedure. The first RRC connection establishment procedure is to establish a first RRC connection towards a radio access network element of the wireless communication network implementing a first Radio Access Technology (RAT). The context information is associated with a wireless communication device of the wireless communication network. The context information is usable for a second RRC connection establishment procedure to establish a second RRC connection towards a radio access network element of the wireless communication network implementing a second RAT.

The network element 20 may comprise a receiving module 24. The receiving module is for receiving, by the radio access network element implementing the first RAT, the context information or the information needed for setting up the context information.

The radio access network element implementing the first RAT corresponds to or is different from the radio access network element implementing the second RAT.

The network element 20 may comprise a providing module 26. If the radio access network element implementing the first RAT is different from the radio access network element implementing the second RAT, the providing module is for providing, by the radio access network element implementing the first RAT, the context information to the radio access network element implementing the second RAT.

The providing module may further be for providing the wireless communication device with information related to the establishment of the second RRC connection.

The providing module may further be for providing the information related to the establishment of the second RRC connection in a Downlink (DL) message of the first RRC connection establishment procedure. Alternatively, the providing module may be for providing the information related to the establishment of the second RRC connection via broadcast system information.

The information related to the establishment of the second RRC connection comprises at least one of: a cell identity of the cell associated with the radio access network element implementing the second RAT; an identifier to be used when accessing the radio access network element implementing the second RAT; access information for accessing the radio access network element implementing the second RAT;

information about conditions or trigger events indicating when to connect to the radio access network element implementing the second RAT.

Figure 9:
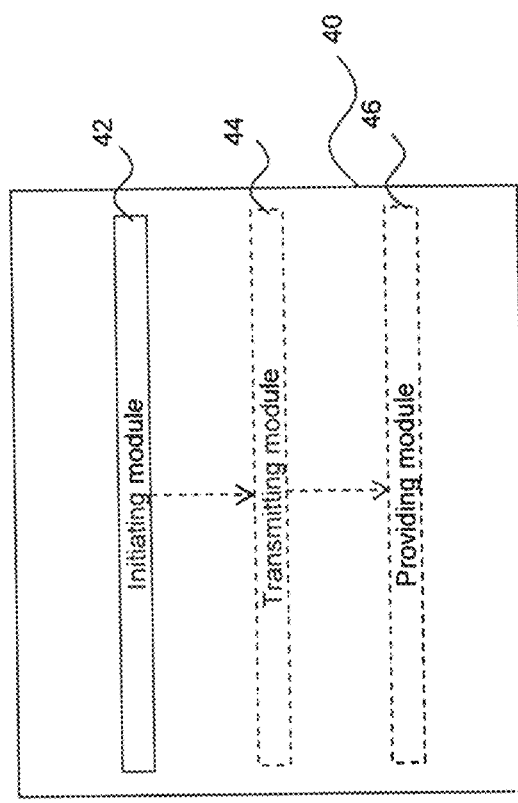
FIG. 9 is a block diagram schematically illustrating a further embodiment of a wireless communication device.

FIG. 9 shows a functional block diagram of a wireless communication device 40 configured in accordance with the principles of the disclosure as described above. The functional blocks of the wireless communication device 40 may be implemented by hardware, software, or a combination of hardware and software to carry out the principles of the disclosure. It is understood by a person skilled in the art that the functional blocks described in FIG. 9 may be combined into one or more blocks or separated into sub-blocks to implement the principles of the disclosure as described above. Therefore, the description herein may support any possible combination or separation or further definition of the functional blocks described herein.

The wireless communication device 40 of FIG. 9 is initiating Radio Resource Control (RRC) connection establishment in a wireless communication network. The wireless communication device 40 comprises an initiating module 42 for initiating, using context information, an RRC connection establishment procedure. The context information is associated with a wireless communication device of the wireless communication network. The context information is set up during a first RRC connection establishment procedure to establish a first RRC connection towards a radio access network element of the wireless communication network implementing a first Radio Access Technology (RAT). The initiating module is for initiating a second RRC connection establishment procedure to establish a second RRC connection towards a radio access network element of the wireless communication network implementing a second RAT.

The wireless communication device 40 may comprise a transmitting module 44 for transmitting an RRC reestablishment message.

The wireless communication device 40 may comprise a providing module 46 for providing the radio access network element implementing the second RAT with a previous identifier of the wireless communication device.

As described herein, simultaneous multi-RAT connection, faster RRC connection establishment in multi-RAT networks, lower RRC signaling load, and/or increased robustness of the RRC connection for the multi-RAT network can be facilitated by means of the devices and methods described herein.

Many advantages of the present disclosure will be fully understood from the foregoing description, and it will be apparent that various changes may be made in the form, construction and arrangement of the units and devices without departing from the scope of the present disclosure and/or without sacrificing all of its advantages. Since the present disclosure can be varied in many ways, it will be recognized that the present disclosure should be limited only by the scope of the following claims.

What is claimed is:

1. A wireless communication device comprising:
a processor; and
memory containing instructions executable by the processor whereby the wireless communication device is configured to:
set up context information during a Radio Access Technology (RAT) connection setup to establish a first Radio Resource Control (RRC) connection towards a first radio access network element implementing a first RAT;
receive an indication, from the first radio access network element, to set-up, using the context information, a second RRC connection between the wireless communication device and a second radio access network element implementing a second RAT;
responsive to the indication, set up the second RRC connection; and
maintain the first RRC connection and the second RRC connection at the same time.

2. The wireless communication device of claim 1, wherein the memory comprises instructions executable by the processor whereby the wireless communication device is configured to, in response to the first RRC connection being lost, establish the second RRC connection.

3. The wireless communication device of claim 1, wherein the memory comprises instructions executable by the processor whereby the wireless communication device is configured to establish the second RRC connection based on at least one of a trigger event and a network command.

4. The wireless communication device of claim 3, wherein the memory comprises instructions executable by the processor whereby the wireless communication device is configured to establish the second RRC connection based on a network command to setup dual connectivity.

5. The wireless communication device of claim 3, wherein the memory comprises instructions executable by the processor whereby the wireless communication device is configured to establish the second RRC connection based on a trigger event that comprises or is a Radio Link Failure (RLF) of the first RRC connection.

6. The wireless communication device of claim 1,
wherein the memory comprises instructions executable by the processor whereby the wireless communication device is configured to set up the second RRC connection by reconfiguring the RRC connection to update the context information for the second RRC connection; and
wherein the context information is related to the wireless communication device.

7. The wireless communication device of claim 1, wherein the memory comprises instructions executable by the processor whereby the wireless communication device is configured to set up the second RRC connection by reconfiguring the RRC connection to change the bearer for the second RRC connection.

8. The wireless communication device of claim 1, wherein the memory comprises instructions executable by the processor whereby the wireless communication device is configured to reconfigure the second RRC connection by using an RRCConnectionReconfiguration message.

9. A first radio access network element comprising:
a processor; and
memory containing instructions executable by the processor whereby the first radio access network element is configured to:
set up context information during a Radio Access Technology (RAT) connection setup to establish a first Radio Resource Control (RRC) connection between a wireless communication device and the first radio access network element implementing a first RAT; and
send the context information toward a second radio access network element of the wireless communication network to establish a second RRC connection between the wireless communication device and the second radio access network element implementing a second RAT; and
maintain the first RRC connection at the same time as the second RRC connection.

10. The first radio access network element of claim 9, wherein the first RRC connection uses a different radio bearer than the second RRC connection.

11. The first radio access network element of claim 9, wherein the first radio access network element is a first base station, and the second radio access network element is a second base station different than the first base station.

12. The first radio access network element of claim 9, wherein the memory comprises instructions executable by the processor whereby the first radio access network element is configured to send the context information in response to determining the first radio access network element is different from the second radio access network element.

13. The first radio access network element of claim 9, wherein the memory comprises instructions executable by the processor whereby the first radio access network element is configured to send an indication to the wireless communication device to set up, using the context information, a second RRC connection between the wireless communication device and the second radio access network element, wherein the context information is related to the wireless communication device of the wireless communication network.

14. The first radio access network element of claim 9, wherein the memory comprises instructions executable by the processor whereby the first radio access network element is configured to exchange information with a mobility management entity regarding the second RRC connection.

15. The first radio access network element of claim 9, wherein the memory comprises instructions executable by the processor whereby the first radio access network element is configured to receive, by the first radio access network element implementing the first RAT, the context information or information needed for setting up the context information.

16. The first radio access network element of claim 9, wherein the memory comprises instructions executable by the processor whereby the first radio access network element is configured to provide the wireless communication device with information related to the establishment of the second RRC connection.

17. The first radio access network element of claim 9, wherein the memory comprises instructions executable by the processor whereby the first radio access network element is configured to establish the second RRC connection using the context information.

18. A second radio access network element comprising:

a processor; and memory containing instructions executable by the processor whereby the first radio access network element is configured to:

receive context information from the first radio access network element implementing a first Radio Access Technology (RAT) to establish a second RRC connection between a wireless communication device of the wireless communication network and the second radio access network element implementing a second RAT, wherein the context information was set up in a RAT connection setup to establish a first RRC connection between the wireless communication device and the first radio access network element; and set up the second RRC connection using the context information; and maintain the first RRC connection at the same time as the second RRC connection.

\* \* \* \* \*

UNITED STATES PATENT AND TRADEMARK OFFICE
CERTIFICATE OF CORRECTION

PATENT NO. : 11,166,204 B2
APPLICATION NO. : 16/889867
DATED : November 2, 2021
INVENTOR(S) : Yilmaz et al.

It is certified that error appears in the above-identified patent and that said Letters Patent is hereby corrected as shown below:

On the Title Page

On Page 2, item (56), under "OTHER PUBLICATIONS", in Column 2, Line 12, delete "intergration" and insert -- integration --, therefor.

In the Specification

In Column 1, Line 7, delete "2018," and insert -- 2018, now Pat. No. 10,687,256, --, therefor.

In Column 9, Lines 19-20, delete "Evolved UMTS Universal Terrestrial Radio Access (E-UTRA)" and insert -- Evolved Universal Terrestrial Radio Access (E-UTRA) --, therefor.

In Column 9, Lines 20-21, delete "interlace of 3GPP's Long Term Evolution (LIE)" and insert -- interface of 3GPP's Long Term Evolution (LTE) --, therefor.

In Column 9, Line 57, delete "WDCMA" and insert -- WCDMA --, therefor.

Signed and Sealed this
Nineteenth Day of April, 2022

Katherine Kelly Vidal
*Director of the United States Patent and Trademark Office*